US012627868B2

(12) United States Patent
Oesterreicher, III et al.

(10) Patent No.: US 12,627,868 B2
(45) Date of Patent: May 12, 2026

(54) MEDIA AND DATA SYNCHRONIZATION AND ENCODING PLATFORM

(71) Applicant: Streaming Global, Inc., Alpharetta, GA (US)

(72) Inventors: Richard Oesterreicher, III, Alpharetta, GA (US); William M. Ortega, III, Lawrenceville, GA (US); Craig Murphy, Suwanee, GA (US)

(73) Assignee: Streaming Global, Inc., Alpharetta, GA (US)

( * ) Notice: Subject to any disclaimer, the term of this patent is extended or adjusted under 35 U.S.C. 154(b) by 374 days.

(21) Appl. No.: 18/177,250

(22) Filed: Mar. 2, 2023

(65) Prior Publication Data

US 2023/0283865 A1 Sep. 7, 2023

Related U.S. Application Data

(60) Provisional application No. 63/321,186, filed on Mar. 18, 2022, provisional application No. 63/321,183, filed on Mar. 18, 2022, provisional application No. 63/316,532, filed on Mar. 4, 2022.

(51) Int. Cl.
| | |
|---|---|
| *H04N 21/8547* | (2011.01) |
| *H04N 21/433* | (2011.01) |
| *H04N 21/854* | (2011.01) |

(52) U.S. Cl.
CPC ....... *H04N 21/8547* (2013.01); *H04N 21/433* (2013.01); *H04N 21/85406* (2013.01)

(58) Field of Classification Search
CPC ............. H04N 21/8547; H04N 21/433; H04N 21/85406
USPC ......................................................... 370/503
See application file for complete search history.

(56) References Cited

U.S. PATENT DOCUMENTS

| | | | | |
|---|---|---|---|---|
| 2015/0062353 A1* | 3/2015 | Dalal | ................. | H04N 21/4394 348/515 |
| 2021/0306396 A1* | 9/2021 | Kye | ...................... | G06F 1/1616 |
| 2022/0038222 A1* | 2/2022 | Rasbornig | ................. | H04L 1/22 |

* cited by examiner

*Primary Examiner* — Hermon Asres
(74) *Attorney, Agent, or Firm* — BEKIARES ELIEZER LLP

(57) ABSTRACT

The present platform helps to synchronize presentation of content and visualization of data associated with the content. Embodiments of the platform may include one or methods, systems, and/or computer readable media for causing a device to receive, from a content source, content comprising one or more of video data and audio data, for packaging into a content file. The device may further receive, from a data source, secondary data for synchronous visualization with the received content. The device may package the received content and the received secondary data into a single MP4 container. The device may transmit the packaged single container including the content and the secondary data to one or more viewing devices for synchronous display of both the content and the secondary data.

20 Claims, 7 Drawing Sheets

_400_

_405_

Receive Content Source Feed

_410_

Encode Source Feed for Distribution to Downstream Devices

_415_

Transmit Encoded Source Feed to Downstream Devices

_420_

Cause Downstream Device to Process the Content

*500*

*505*

Content Packager Receives Content Data

*510*

Content Packager Receives Secondary Data

*515*

Content Packager Packages Content and Data in a Single Container

*520*

Packaged Data is Transmitted to a Viewing Device for Content Display and Synchronous Data Visualization

600

Server

First Presentation Device

Second Presentation Device

605

610

615

620

625

630

640a

640b

645a

645b

MEDIA AND DATA SYNCHRONIZATION AND ENCODING PLATFORM

RELATED APPLICATIONS

Under provisions of 35 U.S.C. § 119(e), the Applicant claims benefit of U.S. Provisional Application No. 63/316,532 filed on Mar. 4, 2022, U.S. Provisional Application No. 63/321,183 filed on Mar. 18, 2022, and U.S. Provisional Application No. 63/321,186 filed on Mar. 18, 2022, and having inventors in common, which are incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to content encoding. In particular, improved encoding for use in content processing and/or to facilitate synchronizing video viewing, audio listening, and/or data visualization across multiple viewing devices and locations, and/or embedding data within a media container for synchronization purposes.

BACKGROUND

Content encoding is the process of compressing large, raw video and/or audio files so that they use less network bandwidth. Transporting uncompressed raw video can require a prohibitively large amount of data be sent over a connection. Given the constant struggle for bandwidth efficiency, compression can significantly reduce the bandwidth required, making it possible for real-time video streams or files to be transmitted across constrained networks such as the public internet. However, the compression comes at the expense of video quality.

Typically compression algorithms, especially those used for streaming media, are described as "lossy," meaning that each time data is converted or saved using the algorithm, some amount of data is lost and cannot be recovered. However, these compression algorithms (known as codecs) can reduce file size by up to 1000 times, when compared to the size of the raw content data.

Typically, after content is encoded, it is transcoded to one or more quality levels (e.g., bit rates, resolutions) for distribution (e.g., into a format that meets the Moving Picture Experts Group (MPEG)-4 Advanced Video Coding (MP4) standards). Transcoding is the process of converting encoded content from one format to another, or from one size or quality to another. Most transcoders use a two-step process of decoding and re-encoding. Step one involves decoding the original data (e.g., the source content) into an intermediate format, and step two re-sizes and re-encodes the video to one or more new files. The transcoding process allows for distribution to clients requiring a variety of quality levels and having a variety of connection capabilities. For example, a first using a satellite or cellular data connection may require (or request) a lower quality version of the content to reduce data throughput on the connection, while a second viewer using a high-speed data connection may request a higher quality version of the content. The transcoding allows a content server to store multiple versions of the content to meet the needs of both viewers.

Following transcoding, the content can be packaged and stored for distribution to viewing devices.

As discussed above, the step of encoding can introduce loss of quality based on the lossy codec used in the encoding process. The step of transcoding can exacerbate the loss of data and introduce additional loss by decoding and re-encoding the content. The loss of data typically manifests as loss of detail in the audio and/or video content. For example, video may become blurry and/or pixelated due to loss of detail data. This loss in detail can make for an unpleasant viewing experience, and can make the content less usable for various applications, including cognitive processing.

While lossless media encoding algorithms do exist, the data produced by the lossless algorithm is generally still too large to transmit over a network in real time. Especially as camera resolutions increase to 4K, 8K, and beyond, compression and encoding are needed for efficient transport of media data.

Network latency in a packet-switched network is measured as either one-way (the time from the source sending a packet to the destination receiving it), or round-trip delay time (the one-way latency from source to destination plus the one-way latency from the destination back to the source). Round-trip latency is more often quoted, because it can be measured from a single point.

When presenting time-based media or data, the player or viewing software aligns the content onto a timeline localized to the viewing/listening device. This is often referred to as the Presentation Timeline.

The Presentation Timeline uses a clock or timing process specific to the viewing/listening device to keep the presentation of content consistent relative to the progression of real-time. For example, a 90-minute movie should have a presentation duration of 90 minutes, and a one second fragment of video should have a presentation duration of one second when viewed.

However, because the clock being used for the Presentation Timeline is local to a specific device, each viewing/listening device is separate and possibly in a different geographic location, and each person initiating the playback may initiate the playback (i.e., hit the play/watch/listen button) at a different time, the Presentation Timeline for each device often has a different start time, from the frame of reference of one or more content servers.

In addition, since the viewing/listening devices are separate, and possibly in different geographic locations, there is no relative synchronization of the Presentation Timelines of the various viewing/listening devices to a shared clock or actual time.

Moreover, in conventional systems, when data is to be presented synchronously with audio and/or video content, the data files are transmitted separately from the content files. However, because the data files and content files are generated by separate systems, those systems may or may not be time-synchronized to each other. If the systems are not time-synchronized, then any time stamps placed in those external files may introduce inaccurate offsets in synchronization because the individual source clocks of the systems creating the data files and the content files were not synchronized. Accordingly, the data may be displayed at different times relative to the content, causing synchronization errors. Moreover, the difference in time between when data from various sources is received may not be readily ascertainable, and may not be constant. Thus, if time stamps are not created with synchronized time sources, the time stamps are most likely of little to no use when synchronizing data and content from multiple sources.

Brief Overview

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present platform for encoding and synchronizing media and/or other data helps to improve the quality of media data provided via a streaming media communication. Every decode and reencode step of media data (e.g., video content) may decrease visual quality due to lossy, irreversible compression. By reducing the number of decoding steps the present platform for improving media source quality correspondingly reduces the amount of visual degradation and artifacts and improves the quality of the source media data at the end of the work flow. That is, reducing video encoding, transcoding, and replication steps not only shortens media transport times, but also minimizes visual artifacts arising from progressive generational loss, thus improving visual quality. This results in more timely video data and increased quality, which can improve a viewing experience. Because cognitive processing cannot begin prior to the source data arriving, and the cognitive processing results are based on the quality of the input source, the improved latency and visual quality can also allow for faster and more accurate classification, and improved cognitive processing for downstream applications.

In aspects, embodiments of the platform may include one or methods, systems, and/or computer readable media for receiving raw content data and encoding the received raw content data a plurality of times. The plurality of encodings of the raw content data may result in generation of a plurality of encoded content files. Each of the plurality of encoded content files may be encoded based on one or more quality parameters, such that each of the plurality of encoded content files has a different quality. The platform may package the plurality of encoded content files for distribution, and distribute one or more of the plurality of encoded content files to one or more downstream devices.

The platform for encoding and synchronizing media and/or other data may also allow for synchronization of presentation of content (e.g., video, audio, and/or data). The content presentation synchronization can be accomplished by each of a plurality of presentation devices requesting the server time from a content server. The content server can reply to each request with a current server time. Each presentation device can subtract the round trip network time (e.g., the time between sending the request to receiving the response) to establish network transfer time. The presentation device may subtract the current presentation device time from the received server time to determine a presentation device-specific time delta. The content server may be configured to provide a presentation timestamp within metadata associated with the content, the presentation timestamp indicating a time at which the content is to be presented. Each presentation device may calculate a device-specific presentation time for the content by applying the presentation device-specific time delta to the presentation timestamp to determine a synchronized presentation time, on the presentation device, at which presentation of the content should begin. In this way, presentation timestamps across multiple devices can be synchronized with respect to time indicated by the content server.

In aspects, embodiments of the platform may include one or methods, systems, and/or computer readable media for transmitting, from a first presentation device to a server, a first request for a server time. The first presentation device receives, responsive to the first request, a first server time indication. Based on a time at the first presentation device at which the first server time indication is received and the received first server time indication, a first device specific time delta associated with communication from the server can be calculated. The first presentation device may receive content for presentation. The content may include a presentation timestamp indicating a time at which the content is to be presented. The first presentation device may calculate a first device specific presentation time based on the first device specific time delta and the presentation timestamp. Responsive to a current time at the first presentation device matching the first device specific presentation time, presenting the received content.

The present platform for encoding and synchronizing media and/or other data allows for data and media to be time synchronized for analysis and/or viewing. In particular, the platform may combine media and other data inside a single container, embedding the data in the media container. Embedding external data into the same delivery container as the media inherently locks and synchronizes that data to the media at a network delivery level. That is, data flowed into the container at media timestamp n inherits that same timestamp. In embodiments, the data and media may be combined by comparing a timestamp associated with the data with an embedded presentation time stamp (PTS) of MOOV/MOOF boxes in a container compatible with the MP4 container format (an MP4 container). Any skew between the two timestamps is immediately available and deterministic. Additionally, multiple data sources may synchronize clocks with one another (and with a content packager). The clock synchronization may allow for the disparate data sources to create timestamps that are usable across devices.

In aspects, embodiments of the platform may include one or methods, systems, and/or computer readable media for causing a device to receive, from a content source, content (e.g., movie data, audio data, and/or the like) comprising one or more of video data and audio data, for packaging into a content file. The device may further receive, from a data source, secondary data for synchronous visualization with the received content. The device may package the received content and the received secondary data into a single MP4 container. The device may transmit the packaged single container including the content and the secondary data to one or more viewing devices for synchronous display of both the content and the secondary data.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being

Figure 1:
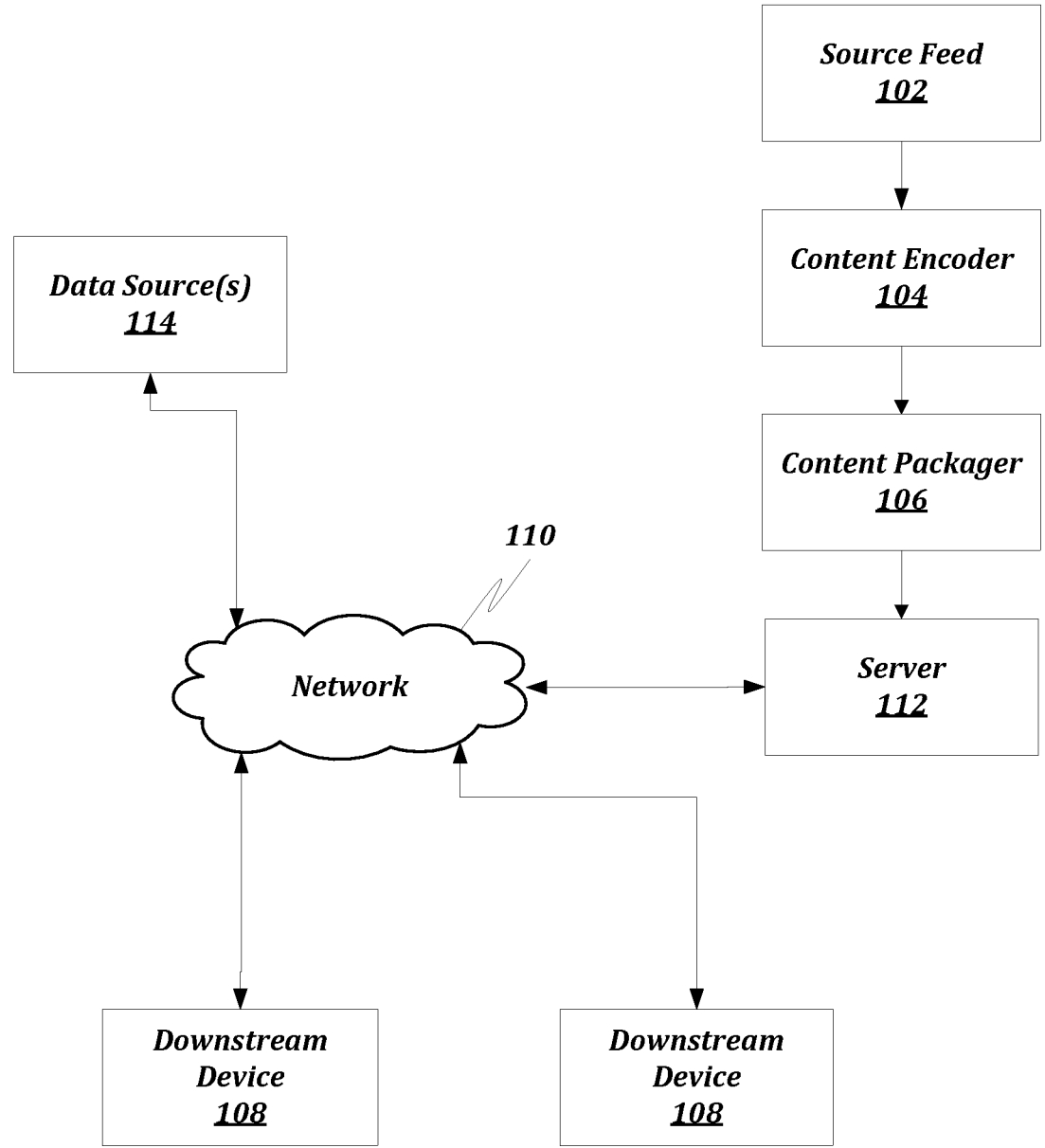

5 used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Figure 2:
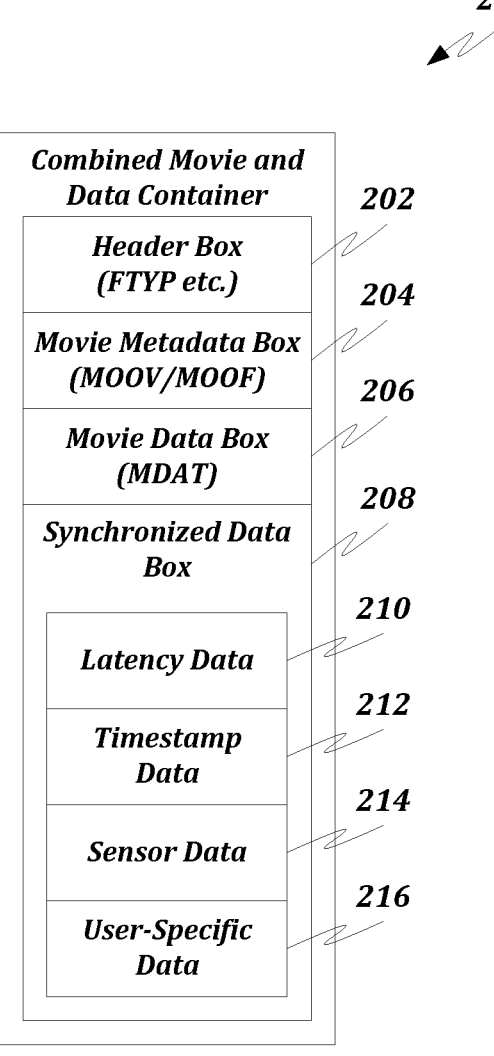
Figure 3A:
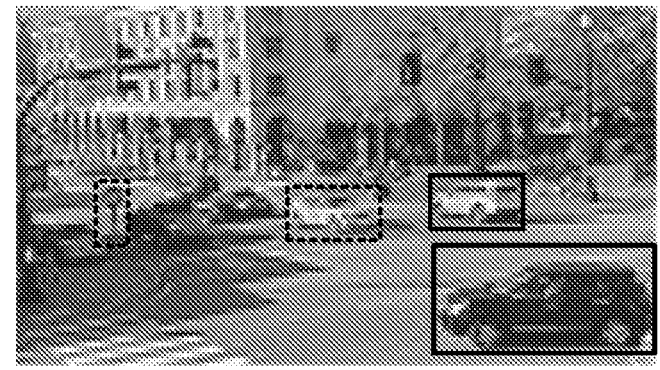
Figure 3B:
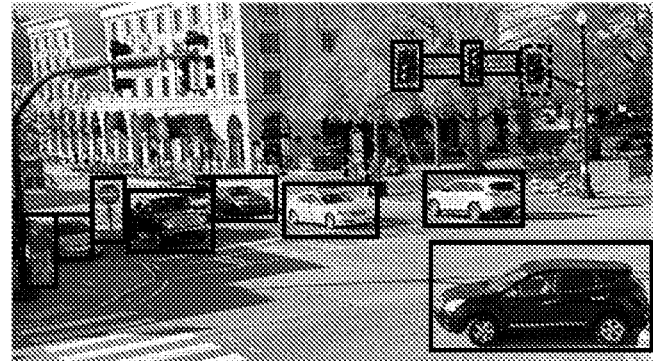
Figure 4:
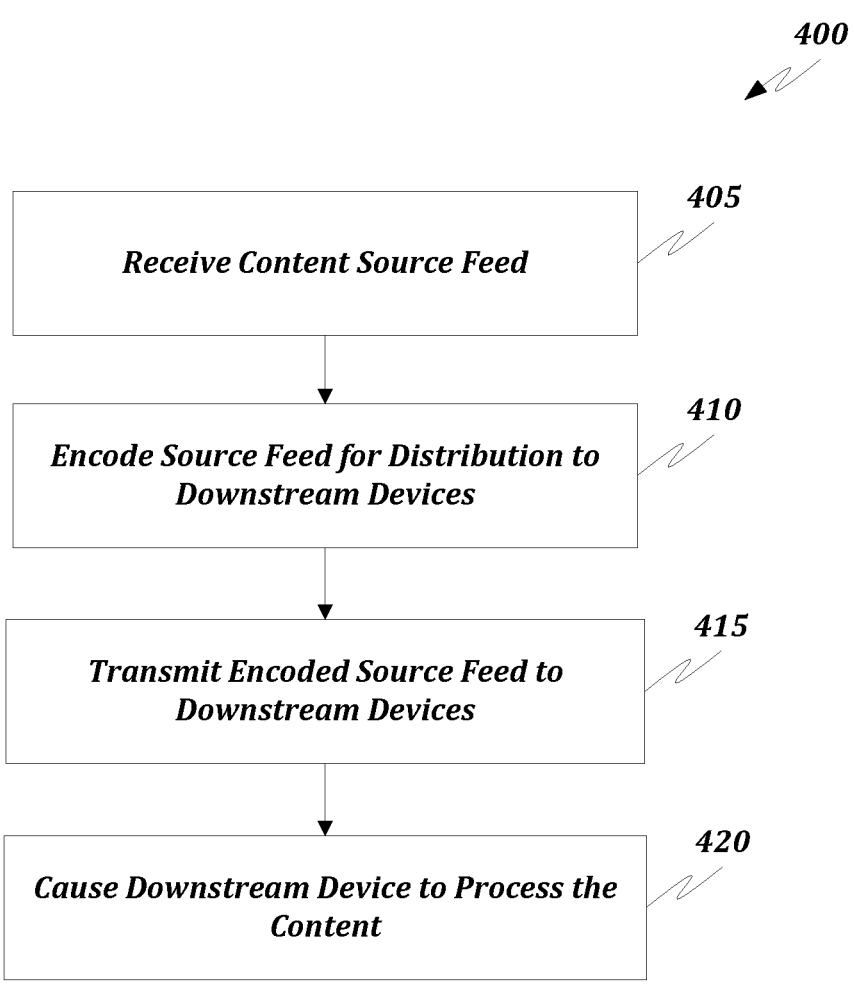
Figure 5:
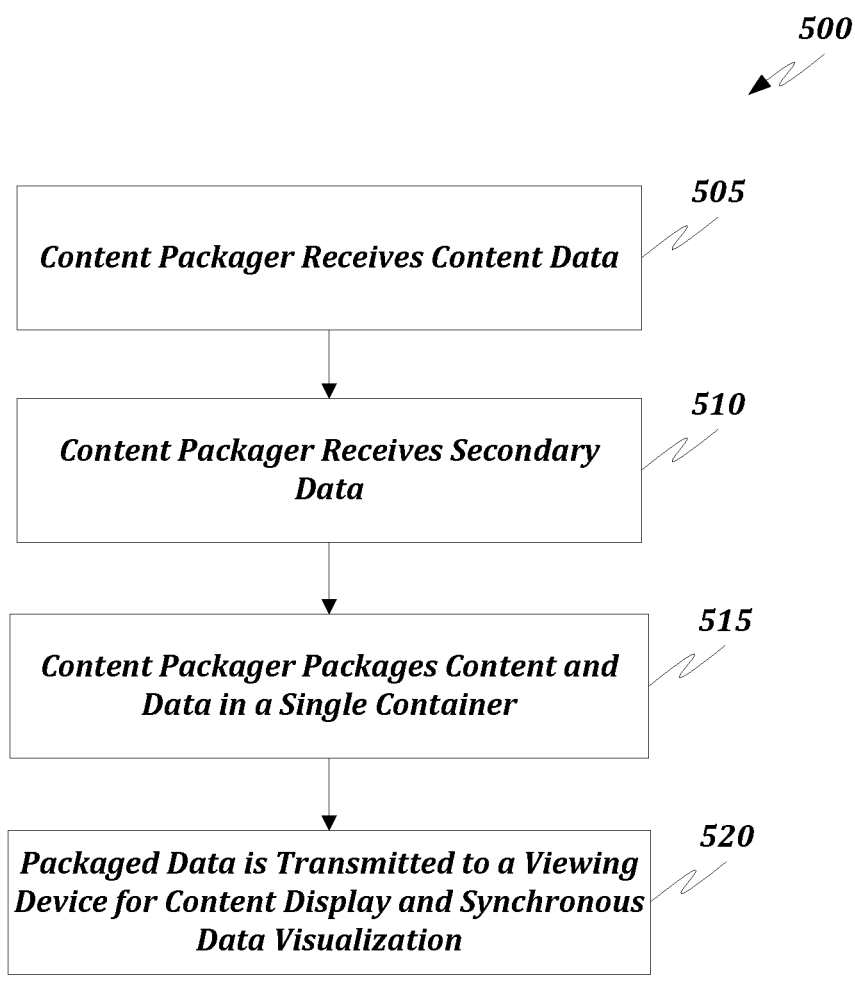
Figure 6:
Figure 7:
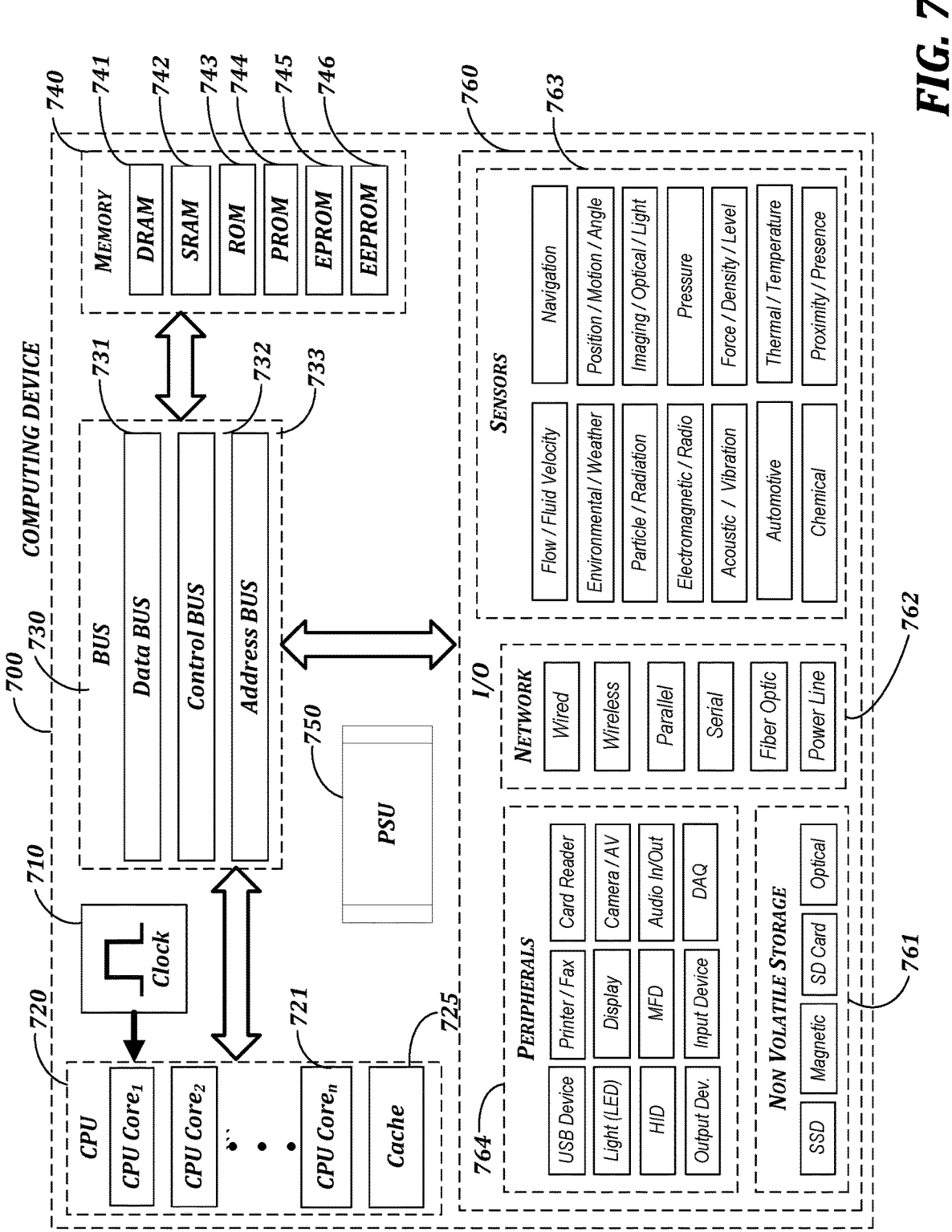

Furthermore, the drawings may contain text or captions that may explain certain embodiments of the present disclosure. This text is included for illustrative, non-limiting, explanatory purposes of certain embodiments detailed in the present disclosure. In the drawings:

FIG. 1 illustrates a block diagram of an operating environment for a media and data synchronization and encoding platform consistent with the present disclosure;

FIG. 2 shows a data container packaged using the media and data synchronization and encoding platform of FIG. 1;

FIG. 3A is a screen capture showing content processed using a conventional encoding and transcoding system, when used by a cognitive processing system;

FIG. 3B is a screen capture showing content processed using the platform for improving media quality, when used by a cognitive processing system;

FIG. 4 shows operations for performing a content encoding method using the media and data synchronization and encoding platform in accordance with FIG. 1;

FIG. 5 shows operations for performing a content synchronization method using the media and data synchronization and encoding platform in accordance with FIG. 1;

FIG. 6 shows operations for performing a data synchronization method using the media and data synchronization and encoding platform in accordance with FIG. 1; and FIG. 7 is a block diagram of a system including a computing device for use with the platform for improving media quality.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of data delivery buffering without delay, embodiments of the present disclosure are not limited to use only in this context.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

Streaming content, such as audio and/or video content, typically begins as either a digital or analog audio and/or video signal. Conventionally, that signal is encoded into a transport-specific streaming file format that is not consumable by most clients and/or end users. The transport-specific streaming file format (e.g., MPEG-TS) may then be unpackaged or decoded and repackaged and transcoded into a streaming file format that can be distributed to and consumed by clients and/or end users. The transcoded content files may be packaged for distribution. However, because each of the file formats used in conventional streaming encoding and transport processes uses a lossy compression algorithm, video quality is necessarily and irreversibly lost at source protocol conversion, encoding, and transcoding steps. This can result in videos that are lacking in detail. This lack of detail can diminish the viewing experience for a viewer. Moreover, the reduction in quality can make the videos unsuitable for use by downstream applications in classification and/or cognitive processing, and particularly in real-time or near-real-time classification and/or cognitive processing, as the applications may rely on details captured in video to perform fast and accurate classification and/or cognitive processing.

The present platform for transmitting and synchronizing data and media may eliminate many of the quality reductions present in the conventional system. In particular, the present platform may receive content from a source. The received content may be directly encoded by the present platform into a plurality of content files, having a variety of quality tiers. This eliminates stages of protocol conversion and transcoding, reducing the number of times that data is converted, and thus mitigating compression effects while still allowing data to be easily transmitted to viewing devices having varied connection qualities.

In some embodiments, the present platform for transmitting and synchronizing data and media may provide downstream devices (e.g., presentation devices) with content to be presented in a synchronized manner, such that multiple downstream devices present the same content at substantially the same time. The platform may provide time data from a server to the downstream devices, and may include particular times at which content is to be played back, thereby causing the downstream devices to initiate playback of the same content at the same time.

In some embodiments, the present platform for transmitting and synchronizing data and media may further embed data from one or more data sources within a media container. The media container may also include media for presentation at a downstream device. In this way, the media container may be used to facilitate display of the content (e.g., a movie, an audio file, etc.) and contemporaneous display or visualization of the data transmitted with the content.

Embodiments of the present disclosure may comprise methods, systems, and/or computer readable media comprising, but not limited to, at least one of the following:
A. A Source Feed;
B. A Content Encoder;
C. A Packager;
D. A Network; and
E. Downstream Devices.

In some embodiments, the present disclosure may provide additional methods, systems, and/or computer readable media comprising, but not limited to:
E. A Server; and
F. One or More Data Sources.

Details with regards to each module is provided below. Although devices are disclosed with specific functionality, it should be understood that functionality may be shared between devices, with some functions split between devices, while other functions may be duplicated by the various devices. Furthermore, the name of each device should not be construed as limiting upon the functionality of the device. Moreover, each component disclosed within each device can be considered independently without the context of the other components within the same device or different devices. Each component may contain language defined in other portions of this specifications. Each component disclosed for one device may be mixed with the functionality of another device. In the present disclosure, each component can be claimed on its own and/or interchangeably with other components of other modules.

Consistent with embodiments of the present disclosure, a method may be performed by at least one of the devices disclosed herein. The method may be embodied as, for example, but not limited to, computer instructions, which when executed, perform the method.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1 illustrates one possible operating environment through which a platform consistent with embodiments of the present disclosure may be provided. By way of non-limiting example, a platform 100 for improved media quality may be hosted on, for example, a cloud computing service. In some embodiments, the platform 100 may be hosted on a computing device 700. A user may access platform 100 through a software application and/or hardware device. The software application may be embodied as, for example, but not be limited to, a website, a web application, a desktop application, and a mobile application compatible with the computing device 700.

As shown in FIG. 1, the platform 100 may comprise a source feed 102, a content encoder 104, a content packager 106, and a downstream device 108, connected via a network 110. In some embodiments, the platform 100 may comprise one or more of a server 112 and/or one or more data sources 114 connected via the network 110.

Accordingly, embodiments of the present disclosure provide a software and hardware platform comprised of a distributed set of computing elements, including, but not limited to:
A. Source Feed The source feed 102 may comprise hardware and/or software used to capture and/or transmit content. In some embodiments, the source feed 102 may include hardware and/or software for capturing content in a raw format and transfer the captured content to one or more other devices, such as the content encoder. In other embodiments, the source feed 102 may receive content and transmit the content to the one or more other devices. In some embodiments, the content may comprise live content, generated substantially in real time. Additionally or alternatively, the content may comprise one or more pre-generated content files.

In some embodiments, the source feed 102 may be in communication with one or more content capture devices. In other embodiments, the source feed 102 may include the one or more content capture devices.

In embodiments, the source feed 102 may be in communication with the content encoder 104 to provide the content to the encoder for encoding.

B. Content Encoder

The content encoder 104 may comprise hardware and/or software used to encode content received from the source feed 102. In embodiments, the content encoder may encode the content at one or more (e.g., a plurality of) quality levels. The content encoder may use a video compression algorithm, known as a codec, to compress the content based on one or more quality parameters. As an example, the one or more quality parameters may include a bit rate, a resolution and/or a frequency. There are many quality parameters that may be used by the compression algorithm.

The content encoder may apply the video compression algorithm to the received content from the source feed multiple times, using a different setting each time. In this way, the content encoder may encode the received content at a plurality of quality levels. This plurality of content levels may be useful for adaptive bit rate streaming. As a particular example, the same source content may be encoded into 10 distinct files, with each file having differing quality parameters, such that 10 versions of the content having graduated quality levels are available to a downstream device for viewing or other processing. In this way the content is encoded directly from the source feed to multiple content files, without need for transcoding.

Because the content encoder 104 encodes the content directly into a format for use by the downstream devices, the content encoder also reduces processing time for converting the video by eliminating the step of transcoding. This reduction in processing time effectively improves latency of the video stream.

In embodiments, the content encoder 104 may be in communication with the content stream for receiving content. The content encoder may be in communication with the content packager 106 for packaging the encoded content for distribution.

C. Content Packager

The content packager 106 may comprise hardware and/or software used to package encoded content (e.g., video and/or audio content) for distribution. The content packager 106 may further comprise hardware and/or software for dividing the content into a plurality of fragments. In some embodiments, the content packager may comprise hardware and/or software for storing the fragments.

In embodiments, the plurality of fragments into which the content is divided may comprise fragments compatible with a distribution protocol. For example, each fragment may have a length of between a fraction of a second (e.g., 0.5 seconds) and 2 seconds, though lengths of 12 seconds or greater are possible. As a particular example, each content fragment may have a length of 10 seconds. In embodiments, each content fragment may have a name comprising a content identifier (e.g., an alphanumeric string identifying the content) and an index identifier (e.g., an alphanumeric string indicating an index of the particular fragment).

In particular, the content packager 106 may be configured to package content using MP4 multimedia container format standards, as set forth in the MPEG-4 Part 14 (ISO/IEC 14496-14:2003). In embodiments, the MP4 container may store content, including video and/or audio content, as well as other data. A conventional MP4 container (e.g., for a fragmented video or a whole video file) may include one or more header boxes, one or more metadata boxes (e.g., one or more MOOV and/or MOOF boxes), a data box (e.g., an MDAT box), and an optional custom box.

As shown in FIG. 2 the content packager 106 may be configured to aggregate video and/or audio content from a content source (e.g., the source feed 102 and/or encoder 104) and data from the one or more data sources 114 into a single data container 200 modeled after the MP4 container.

The data container 200 may include one or more header boxes 202 that conform the to the MP4 standard. For example, the header boxes 202 may include a FTYP header specifying file type, description, and the common data structures used. The headers 202 may further include other header data permitted in the MP4 standard.

The data container 200 may include one or more metadata boxes 204. The metadata boxes may include, for example a MOOV box and/or a MOOF box, as set forth in the MP4 standard. In some embodiments, the metadata box 204 may include, as metadata, a presentation time stamp (PTS).

The data container 200 may include a primary data box 206. The primary data box 206 may conform to the description of the MDAT box in the MP4 standard. For example, the primary data box may include content, such as video and/or audio data. In some embodiments, the content may be generated substantially in real time. In some embodiments, the content may include prerecorded and/or pre-generated data.

The data container 200 may include a synchronized data box 208. The synchronized data box 208 may be used to store data to be presented synchronously with the content.

In embodiments, the synchronized data box 208 may include an indication of latency data 210. The latency data 210 may specify, for example target time sync latency. Indicating a latency between a time at which the data was gathered and a time at which the data is transmitted to the content packager for inclusion in the data container 200.

The synchronized data box 208 may include a timestamp 212. The timestamp 212 may indicate a time at which the data in the synchronized data box 208 is intended to be presented (e.g., displayed, visualized, played back, or otherwise provided to a user). In embodiments, the timestamp 212 may correspond directly to timestamp data in the metadata box 204 (e.g., the presentation timestamp. That is, a relationship between the timestamp 212 and timestamp data from the metadata box 204 may be deterministic and calculable. In some embodiments, the timestamp 212 and the timestamp data from the metadata box 204 may be identical or substantially identical.

In some embodiments, the synchronized data box 208 may include sensor data 214 measured by one or more sensors. In embodiments, the sensor data may comprise data captured substantially contemporaneously with the content, and/or data that should be presented substantially contemporaneously with the content.

In some embodiments, the synchronized data box 208 may include user specified data 214. In embodiments, the user specified data may comprise data captured substantially contemporaneously with the content, and/or data that should be presented substantially contemporaneously with the content.

Accordingly, the synchronized data box 208 can be used to store many types of data for presentation synchronously with the content. In some embodiments, the data stored in the synchronized data box 208 may be extracted from the container 200. In embodiments, the timestamp 212 and any time deltas or synchronization offsets may be applied to the extracted data so that any resulting files may be better synchronized than if they were generated separately from the start.

Keeping data, such as sensor data, in the same container (e.g., the container 200) with the associated media data maintains a higher level of overall data integrity versus multiple disparate files in separate systems. Moreover, keeping the data in the container with the media content helps to lock the data and the media content at a network delivery level. That is, delivery of the media content necessarily entails delivery of the data for the same time period.

In embodiments, the content packager 106 may be in contact with one or more data sources 114 to synchronize times across the data sources. In some embodiments, the content packager 106 may be synchronized to a single time source, such as a network time protocol (NTP) server or precision time protocol (PTP) server. For example, the content packager 106 may be synchronized to the NTP server at the URL time.nist.gov.

The content packager 106 may be in communication with the content encoder 104, to receive the encoded content for packaging and distribution.

The content packager 106 may be in communication with one or more downstream devices 108 to which the packaged content may be transmitted.

D. Data Sources

The platform 100 may include one or more data sources 114. Each data source 114 may comprise hardware and/or software used to gather data for presentation together with video and/or audio content. In some embodiments, a data source 114 may comprise one or more sensors, such as a global positioning system (GPS) sensor, an accelerometer, a temperature sensor, and/or any other sensor performing measurements and/or capturing or recording data in real time or substantially real time.

In embodiments, one or more (e.g., each) of the one or more data sources 114 may be in communication with other devices in the platform (e.g., others of the one or more data sources, the content packager 106 and/or the server 112) and/or an external device, such as an external time source to synchronize times across the data sources 114. In some embodiments, each data source 114 in the platform 100 may be synchronized to an external time source, such as a network time protocol (NTP) server. For example, the data sources 102 may be synchronized to the NTP server at the URL time.nist.gov.

Each data source 114 may be in communication with the content packager 106 via the network 108. In embodiments, the network 110 may comprise a packet-switched network, such as the Internet.

E. Content Server

In some embodiments, the platform 100 may include a content server 112. The content server 112 may comprise hardware and/or software used to store and transmit content (e.g., video content, audio content, and/or data). The content server 112 may include one or more storage devices configured for short-term and/or long-term storage of the content. The content server 112 may store multiple content files, with each content file comprising a plurality of content fragments. In some embodiments, a content file may comprise, for example, audio and/or video content for playback. Additionally or alternatively, a content file may comprise data for visualization.

In embodiments, the content server 112 may be configured to receive requests for content, and to transmit the corresponding content to one or more requesting devices (e.g., one or more downstream devices 108) in response to receiving the request. In embodiments, the request for content may comprise a request for a particular fragment of the content, wherein the particular fragment may be requested based on an index associated with the particular fragment. In some embodiments, the request may further include one or more devices to which the content is to be delivered. In response to receiving a request for a particular fragment, the content server 112 may determine if the requested fragment is stored therein (e.g., in the storage device associated with the content server 112). If the fragment is stored at the content server 112, the content server may provide the requested fragment to the one or more devices specified in the request. In embodiments, providing a content fragment may include providing, with the content fragment, metadata indicating a presentation time associated with the content fragment. The presentation time may indicate a particular time at which presentation (e.g., playback, visualization, etc.) of the content fragment is to be initiated.

In embodiments, the content server 112 may further be configured to receive a time request. Responsive to receiving a time request, the content server may be configured to transmit, to a device from which the request was received (e.g., a presentation device 108), a timestamp indicating a current server time. In some embodiments, the time may be maintained by the server 112. Alternatively, the time may be maintained by an external time source, such as an NTP server (e.g., the NTP server at the URL time.nist.gov) or PTP server.

F. Downstream Devices

The one or more downstream devices 108 may comprise hardware and/or software used to process the packaged encoded content. For example, the one or more downstream devices 108 may include one or more devices for real-time or near-real-time object classification and/or cognitive processing of the packaged encoded content. In embodiments, the one or more downstream devices 108 may comprise one or more of a desktop computing device, a laptop computing device, a tablet, a smartphone, a smart tv, a tv set-top box, and/or any other computing device configured to permit playback of a content file (e.g., playback of audio and/or video content), visualization of a content or data file, and/or any other processing of the content or data file.

Each downstream device 108 may receive the packaged encoded content via the network 110. For example, the downstream device 108 may retrieve the packaged encoded content from a data repository or content storage device (e.g., at the server 112). As another example, the content may be pushed to the downstream device 108. For example, the content file may be transmitted to the downstream device responsive to a request for the content file.

The downstream device 108 may process the packaged encoded content. Processing the packaged encoded content may comprise decoding the content. In some embodiments, processing the content may include causing playback of the decoded content. In other embodiments, processing the content may comprise performing data analysis on the decoded content. For example, the data analysis may include performing real-time or near-real-time object classification and/or cognitive processing based on the data represented in the content.

In this way, the content received by the downstream devices 108 may be packaged such that the content is easily transferrable across a variety of data connections having varying quality and/or throughput. Additionally, the content can benefit from a single encoding step, limiting data loss due to multiple operations using algorithms that cause loss of content information. This allows the content received at the downstream device to be of a higher quality, when compared to content that has been transcoded. Moreover, the single encoding step helps to reduce latency of the video stream. This allows for the content to be analyzed sooner after being captured, when compared to conventional streaming processes. The higher quality content provided at lower latencies allows for faster and/or more accurate classification and processing in real-time or near-real-time.

As a particular example, FIG. 3A shows a first image captured using conventional encoding and transcoding techniques, while FIG. 3B shows the same image captured using the platform 100. As can be seen, the image in FIG. 3B is sharper. Additionally, as shown by the additional bounding boxes in FIG. 3B, the additional detail retained in the encoded image data allows for additional objects to be identified during image analysis and machine learning processing. In particular, the image analysis may rely on (as non-limiting examples) contour tracking and/or detection of object boundaries to determine particular objects in a video for tracking. The added clarity of the encoded image may improve contrast, making it more likely that an image analysis process correctly locates objects of interest in the video content.

In some embodiments, one or more (e.g., each) of the one or more downstream devices 108 may be operable as synchronized presentation devices. The downstream devices 108 may include a plurality of synchronized presentation devices configured to synchronously effect playback of received content (e.g., video and/or audio content) and/or to synchronously display a data visualization corresponding to received data.

To be used as a synchronized presentation device, each downstream device 108 may include a clock that tracks a presentation device time. In embodiments, each downstream device 108 may be configured to receive a server time. For example, the downstream device 108 may be configured to request a server time (e.g., from the content server 112 and/or from an external time source), and to receive the server time in response to the request. Each downstream device 108, when operating as a synchronized presentation device, may calculate a device-specific time delta. For example, the device-specific time delta may be calculated based on the received server time and a device time on a clock of the downstream device 108 when the server time was received. As a specific example, the downstream device 108 may subtract the device time at which the server time is received from the received server time to calculate the device-specific time delta. In some embodiments, the downstream device 108 may determine a round trip network time by subtracting a device time at which the response is received from a device time at which the request was sent. The device-specific time delta may be modified based on the round trip network time.

The downstream device 108 may receive content. For example, the content may be transmitted to the downstream device 108 from a content server (e.g., the content server 112). The content may include metadata specifying a presentation time associated with the content. The downstream device 108 may calculate a device-specific presentation time at which the content should be presented. For example, the downstream device 108 may apply the calculated device-specific time delta to the time indicated by the timestamp. Thereafter, the downstream device 108 may initiate presentation of the content when the time indicated by the clock at the downstream device corresponds to the calculated device-specific presentation time. In this way, each of the downstream devices acting as presentation devices may substantially synchronize presentation time of the content, such that each of the plurality of presentation devices presents the content at substantially the same time, and at the time indicated by the content server.

In some embodiments, the downstream device 108 may comprise hardware and/or software for providing data visualization synchronously with the content playback. The downstream device 108 may receive one or more content fragments packaged by the content packager 106 using the data container 200, as described above. For example, the downstream device 108 may receive the one or more fragments directly from the content packager 106. Additionally or alternatively, the downstream device 108 may receive the one or more content fragments from a server (e.g., the content server 112) or content store between the content packager 106 and the downstream device 108.

After receiving the one or more content fragments, the downstream device 108 may facilitate playback of the content. For example, the downstream device 108 may cause display of the content (e.g., the video and/or audio data) encoded in the one or more content fragments. The downstream device 108 may also facilitate data visualization of the data included in the synchronized data box 208 synchronously with display of the content. For example, the downstream device 108 may display the data included in the synchronized data box alongside the content.

In some embodiments, multiple downstream devices 108 may be used to display the content and data packaged by the content packager 106. For example, the data container 200 packaged by the content packager 106 may include a camera feed and GPS coordinates indicating a position of the camera creating the camera feed. A first downstream device may display the camera feed, and a second downstream device may display a map and the GPS coordinates indicating the position of the camera on the map.

In other embodiments, a single downstream device may be used to display all content and data received from the content packager 104. For example, as discussed above, the data container 200 packaged by the content packager 106 may include a camera feed and GPS coordinates indicating a position of the camera creating the camera feed. A single downstream device may simultaneously display the camera feed along with a map and overlaid GPS coordinates.

Because the content packager 106 follows the rules for the ISO-BMFF container, the container 200 is compatible with any downstream viewing device that supports ISO-BMFF. If the viewing device is unable parse the data in the synchronized data box 208, which complies with the specification, then the viewing device ignores the box 208. In embodiments, the data stored in the synchronized data box 208 is encrypted, so no unauthorized viewing devices would be able to parse the data stored within the box.

The one or more downstream devices 108 may be in communication with the server 112, the content packager 106, and/or any other device (e.g., a device within the platform 100, an external time source, etc.) via the network 110. In embodiments, the network 110 may comprise a packet-switched network, such as the Internet.

III. Platform Operation

Embodiments of the present disclosure provide a hardware and software platform operative by a set of methods and computer-readable media having stored thereon instructions which, when executed by a processor or other computer hardware, are configured to operate the aforementioned devices and computing elements in accordance with at least the below methods. The following depicts examples of a plurality of methods that may be performed by at least one of the aforementioned devices. Various hardware components may be used at the various stages of operations disclosed with reference to each device.

For example, although methods may be described to be performed by a single computing device, it should be understood that, in some embodiments, different operations may be performed by different networked elements in operative communication with the computing device. For example, at least one computing device 700 may be employed in the performance of some or all of the stages disclosed with regard to the methods. Similarly, an apparatus may be employed in the performance of some or all of the stages of the methods. As such, the apparatus may comprise at least those architectural components as found in computing device 700.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the example method without altering or deterring from the fundamental scope of the depicted methods and systems disclosed herein.

A. Method of Transmitting Content for Improved Quality

Consistent with embodiments of the present disclosure, a method may be performed by at least one of the aforementioned devices. The method may be embodied as, for example, but not limited to, computer instructions, which when executed, perform the method.

FIG. 4 is a flowchart illustrating the general stages involved in a method 400 consistent with an embodiment of the disclosure for making use of the platform 100 for improving the quality of content received at a downstream device. In particular, quality may be improved by eliminating transcoding or reencoding steps where possible. The method 400 may be implemented using a computing device 700 or any other component associated with platform 100 as described in more detail below with respect to FIG. 7. For illustrative purposes alone, computing device 700 is one potential actor in the following stages.

Method 400 may begin at stage 405 where the platform may receive a source feed of content. The source feed may include raw audio and/or video data, and may be captured from, for example, a microphone, a camera, and/or any other video or audio capture device. Receiving a source feed may include receiving the source feed directly from the capture device in a raw, uncompressed format.

After receiving the raw the raw source feed in stage 405, the method 400 may proceed to stage 410, where the platform may encode the source feed for distribution to a downstream device for processing. In embodiments, the encoding in stage 410 may be an encoding directly from the raw, uncompressed format to one or more formats suitable for use (e.g., in processing, presentation, etc.) by one or more downstream devices. In some embodiments, the encoding process may comprise encoding the received source data a plurality of time, using a plurality of different quality settings, to create a plurality of different quality levels of the encoded content. As a particular example, the same source content may be encoded into 10 distinct files, with each file having differing quality parameters, such that 10 versions of the content having graduated quality levels are available to a downstream device for viewing or other processing. In this way the content is encoded directly from the source feed to multiple content files, without need for transcoding.

In embodiments, the encoded content may be packaged for streaming delivery to one or more downstream devices, and stored such that the one or more downstream devices can access the packaged content.

In stage 415, the content is transmitted to one or more downstream devices. Transmission may comprise the downstream devices retrieving the packaged content for processing. Retrieving the content may compress requesting, by the downstream device, a particular content file at a particular quality level. The quality level may be selected based, at least in part, on the capabilities of the downstream device, the intended processing of the content, the network conditions for communication between the stored content and the downstream device. As a particular example, a more capable device and/or a device having a higher-resolution playback device may request a content file having a higher quality than a less capable device having a lower-resolution playback device. Similarly, a device that is performing a non-real-time processing using the content may request a higher quality version of the content file than a device performing real-time or near-real-time processing or presentation of the content. There are many factors to be considered in determining the requested quality level.

In stage 420, the platform may cause the downstream device to process the content. The processing performed by the downstream device may include (but need not be limited to) decoding the content, causing playback of the content, and/or performing data analysis on the content. Causing playback of the content may include initiating a playback of video and/or audio data that makes up the content and/or causing visualization of data that makes up the content. Performing data analysis on the content may include performing real-time or near-real-time object classification and/or cognitive processing based on the data represented in the content.

In this way, the platform may provide higher-quality content to the downstream devices, while also reducing the number of steps required (and thus the amount of processing power required) to encode the content.

B. Method of Synchronously Displaying Data

Consistent with embodiments of the present disclosure, a method may be performed by at least one of the aforementioned devices. The method may be embodied as, for example, but not limited to, computer instructions, which when executed, perform the method. FIG. 5 is a flowchart illustrating the general stages involved in a method 500 consistent with an embodiment of the disclosure for making use of the platform 100 for synchronizing presentation of data from multiple data sources at a viewing device. Method 500 may be implemented using a computing device 700 or any other component associated with platform 100 as described in more detail below with respect to FIG. 7. For illustrative purposes alone, computing device 700 is one potential actor in the following stages.

Method 500 may begin at stage 505, where the platform may receive content data. The received content may comprise, for example, video and/or audio data captured by a content capture device. In embodiments, the content data may be encoded for transmission to and/or processing by a downstream device.

In stage 510, the platform may receive data from one or more data sources. At least one of the one or more data sources may comprise a sensor providing sensor data. Additionally or alternatively, at least one of the one or more data sources may comprise a data source providing user-specified data. In some embodiments, at least one of the one or more data source may transmit data to the content packager in real time or substantially in real time. In embodiments, the data received from the one or more data sources may be associated with the device that provided the content data in stage 505. For example, the received data may indicate a position and/or orientation of the device capturing the content. Alternatively or additionally, the data received from the one or more data sources may be associated with a subject of the content. For example, the content may comprise a video of an automobile, and the data may indicate one or more properties of the automobile.

At stage 515, the content packager may package the received content and the received other data in a data container. Packaging the received content may include generating header data for the content to be included in a header box, according to MP4 standards. In particular, the header data may include data specifying file type, description, and the common data structures used. Packaging the received content may include generating metadata associated with the video and/or audio content for inclusion in a MOOV and/or MOOF box, according to MP4 standards. Packaging the data may include packaging the content (e.g., the video data and/or audio data), according to MP4 standards.

In embodiments, packaging the data may include packaging the received sensor data and/or the received user-specified data in a synchronized data box. At least a portion of the data packaged in the synchronized data box may be configured to be displayed or otherwise visualized substantially contemporaneously with the content. In some embodiments, the data included in the synchronized data box may include latency data and/or timestamp data for use in synchronizing the data packaged in the synchronized data box with the content. In particular, the packaging data may include an indication of latency data. The latency data may specify, for example target time sync latency. Indicating a latency between a time at which the data was gathered and a time at which the data is transmitted to the content packager for inclusion in the data container.

At stage 520, the package comprising the content and the data may be transmitted to one or more viewing devices. The one or more viewing devices may facilitate display of the content and simultaneous visualization of the data included in the synchronized data box. In some embodiments, the package may be transmitted to a single viewing device, which may effect both playback of the content and simultaneous visualization of the data. In other embodiments, the package may be transmitted to a plurality of viewing devices, a first subset of the plurality of viewing devices may effect playback of the content, while a second subset of the viewing devices may effect the simultaneous visualization of the data.

In embodiments, the downstream device may use the timestamp and/or latency data for determining a time at which to visualize the data. For example, the timestamp data may indicate an elapsed time (e.g., from a beginning of the content) at which the data was received at the data server, and latency data may indicate a delay between a time at which the data was collected and a time at which the data was received at the data server. The downstream device may calculate a time at which to visualize the data based on the timestamp data and/or the latency data so that the data is visualized substantially simultaneously with the content captured at the time the data was captured.

In this way, the data included in the synchronized data box may be displayed substantially contemporaneously with a relevant portion of the content, such that the synchronized data (e.g., the sensor data and/or the user-defined data) and the content (e.g., the movie data and/or the audio data) are synchronized.

C. Method of Synchronizing Content Presentation Among Presentation Devices

Consistent with embodiments of the present disclosure, a method may be performed by at least one of the aforementioned devices. The method may be embodied as, for example, but not limited to, computer instructions, which when executed, perform the method.

FIG. 6 is a data flow diagram illustrating the general stages involved in a method 600 consistent with an embodiment of the disclosure for making use of the platform 100 for synchronizing presentation of content across two or more presentation devices. Method 500 may be implemented using a computing device 700 or any other component associated with platform 100 as described in more detail below with respect to FIG. 7. For illustrative purposes alone, computing device 700 is one potential actor in the following stages.

Method 600 may begin at stage 605, where a first presentation device may transmit, to a server, such as a content server or other server configured to provide content for visualization and/or playback, a first time request. In embodiments, the first time request may comprise a request that the server provide, to the first presentation device, a current time of the server.

In stage 610, the server may transmit, to the first presentation device, a current server time. The current server time may include at least a time stamp listing a current server time. The current server time may be transmitted in response to the first time request. In embodiments, the current server time may be generated by the server, or may be generated by an external time source in communication with the server.

In stage 615, the first presentation device may calculate a first device specific time delta. The first device specific time delta may be calculated based at least on the received server time and a time, indicated by the first device, at which the server time is received. For example, the first device specific time delta may be calculated by subtracting the current time at the first presentation device at which the server time is received from the received server time. As a particular example, if the received server time is 12:06:01 and the current time at the first presentation device when the server time is received is 12:05:04, the first presentation device specific time delta may be calculated as 00:00:57 (e.g., 57 seconds). In some embodiments, the first presentation device may determine a round trip network time by subtracting a device time at which the response is received (e.g., in step 615) from a device time at which the request was sent (e.g., in step 605). The first device-specific delta may be modified based on the round trip network time.

In stage 620, a second presentation device may transmit, to the server, a second time request. In embodiments, the second time request may comprise a request that the server provide, to the second presentation device, a current time of the server.

In stage 625, the server may transmit, to the second presentation device, a current server time. The current server time may include at least a time stamp listing a current server time. The current server time may be transmitted in response to the second time request.

In stage 630, the second presentation device may calculate a second device specific time delta. The second device specific time delta may be calculated based at least on the received server time and a current time, at the second presentation device, at which the server time is received. For example, the second device specific time delta may be calculated by subtracting the current time at the second presentation device at which the server time is received from the received server time. As a particular example, if the received server time is 12:11:15 and the current time at the second presentation device when the server time is received is 12:10:20, the second device specific time delta may be calculated as 00:00:55 (e.g., 55 seconds). In some embodiments, the second presentation device may determine a round trip network time by subtracting a device time at which the response is received (e.g., in step 630) from a device time at which the request was sent (e.g., in step 620). The second device-specific delta may be modified based on the round trip network time.

In stage 640, each presentation device (e.g., the first presentation device and the second presentation device) may receive, from the server, content that includes a presentation timestamp indicating a time at which presentation of the content is to be initiated. In some embodiments, the received content may be, for example, audio and/or video content. In some embodiments, the content may be data visualization content.

Each presentation device may calculate a presentation device-specific presentation timestamp to be associated with presentation of the content at that specific presentation device. For example, as shown in FIG. 6, at stage 640*a*, the first presentation device may apply the first device specific time delta to the presentation timestamp to calculate a first device-specific presentation timestamp for presentation of the content at the first presentation device; at stage 640*b*, the second presentation device may apply the second presentation device specific time delta to the presentation timestamp to calculate a second presentation device-specific presentation timestamp for presentation of the content at the second presentation device.

In stage 645, responsive to a current time at each respective presentation device reaching the associated presentation device-specific presentation timestamp, the presentation device may present the content associated with the timestamp. In some embodiments, presenting the content may include effecting playback of audio and/or video content and/or providing a visualization of received data. For example, as shown in FIG. 6, at stage 645*a*, responsive to the current time at the first presentation device reaching the first presentation device-specific presentation timestamp, the first presentation device may initiate presentation of the content; at stage 645*b*, responsive to the current time at the second presentation device reaching the second presentation device-specific presentation timestamp, the second presentation device may present the content. For both the first presentation device and the second presentation device, the presentation will coincide with a time at the server that matches the presentation timestamp transmitted by the server. In this way, presentation times of the content may be coordinated and synchronized across multiple presentation devices. Moreover, the presentation time may correspond (as measured by the server clock) to the presentation timestamp indicated by the server.

Embodiments of the present disclosure provide a hardware and software platform operative as a distributed system of modules and computing elements.

Platform 100 may be embodied as, for example, but not be limited to, a website, a web application, a desktop application, backend application, and a mobile application compatible with a computing device 700. The computing device 700 may comprise, but not be limited to the following:

A mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be a rack mounted server, a blade server, an appliance-based computing resource, an accelerator card (such as those manufactured by Xilinx or Intel), a workstation, an industrial device, a raspberry pi, a desktop, or an embedded device;

A purpose-built computing device, wherein the purpose-built computing device comprises hardware and/or software custom designed for a specific deployment environment and/or usage scenario, such as a computing device for use in a satellite or other communication device.

Embodiments of the present disclosure may comprise a system having a central processing unit (CPU) 720, a bus 730, a memory unit 740, a power supply unit (PSU) 750, and one or more Input/Output (I/O) units. The CPU 720 coupled to the memory unit 740 and the plurality of I/O units 760 via the bus 730, all of which are powered by the PSU 750. It should be understood that, in some embodiments, each disclosed unit may actually be a plurality of such units for the purposes of redundancy, high availability, and/or performance. The combination of the presently disclosed units is configured to perform the stages any method disclosed herein.

FIG. 7 is a block diagram of a system including computing device 700. Consistent with an embodiment of the disclosure, the aforementioned CPU 720, the bus 730, the memory unit 740, a PSU 750, and the plurality of I/O units 760 may be implemented in a computing device, such as computing device 700 of FIG. 7. Any suitable combination of hardware, software, or firmware may be used to implement the aforementioned units. For example, the CPU 720, the bus 730, and the memory unit 740 may be implemented with computing device 700 or any of other computing devices 700, in combination with computing device 700. The aforementioned system, device, and components are examples and other systems, devices, and components may comprise the aforementioned CPU 720, the bus 730, the memory unit 740, consistent with embodiments of the disclosure.

At least one computing device 700 may be embodied as any of the computing elements illustrated in all of the attached figures, including the content packager, the metadata generator, the content storage device, and/or the viewing device. A computing device 700 does not need to be electronic, nor even have a CPU 720, nor bus 730, nor memory unit 740. The definition of the computing device 700 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 700, especially if the processing is purposeful.

With reference to FIG. 7, a system consistent with an embodiment of the disclosure may include a computing device, such as computing device 700. In a basic configuration, computing device 700 may include at least one clock module 710, at least one CPU 720, at least one bus 730, and at least one memory unit 740, at least one PSU 750, and at least one I/O 760 module, wherein I/O module may be comprised of, but not limited to a non-volatile storage sub-module 761, a communication sub-module 762, a sensors sub-module 763, and a peripherals sub-module 764.

A system consistent with an embodiment of the disclosure the computing device 700 may include the clock module 710 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 720, the central component of modern computers, which relies on a clock. The only exceptions are asynchronous circuits such as asynchronous CPUs. The clock 710 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 700 use a "clock multiplier" which multiplies a lower frequency external clock to the appropriate clock rate of the CPU 720. This allows the CPU 720 to operate at a much higher frequency than the rest of the computer, which affords performance gains in situations where the CPU 720 does not need to wait on an external factor (like memory 740 or input/output 760). Some embodiments of the clock 710 may include dynamic frequency change, where the time between clock edges can vary widely from one edge to the next and back again.

A system consistent with an embodiment of the disclosure the computing device 700 may include the CPU unit 720 comprising at least one CPU Core 721. A plurality of CPU cores 721 may comprise identical CPU cores 721, such as, but not limited to, homogeneous multi-core systems. It is also possible for the plurality of CPU cores 721 to comprise different CPU cores 721, such as, but not limited to, heterogeneous multi-core systems, big.LITTLE systems and some AMD accelerated processing units (APU). The CPU unit 720 reads and executes program instructions which may be used across many application domains, for example, but not limited to, general purpose computing, embedded computing, network computing, digital signal processing (DSP), and graphics processing (GPU). The CPU unit 720 may run multiple instructions on separate CPU cores 721 at the same time. The CPU unit 720 may be integrated into at least one of a single integrated circuit die and multiple dies in a single chip package. The single integrated circuit die and multiple dies in a single chip package may contain a plurality of other aspects of the computing device 700, for example, but not limited to, the clock 710, the CPU 720, the bus 730, the memory 740, and I/O 760.

The CPU unit 720 may contain cache 722 such as, but not limited to, a level 1 cache, level 2 cache, level 3 cache or combination thereof. The aforementioned cache 722 may or may not be shared amongst a plurality of CPU cores 721. The cache 722 sharing comprises at least one of message passing and inter-core communication methods may be used for the at least one CPU Core 721 to communicate with the cache 722. The inter-core communication methods may comprise, but not limited to, bus, ring, two-dimensional mesh, and crossbar. The aforementioned CPU unit 720 may employ symmetric multiprocessing (SMP) design.

The plurality of the aforementioned CPU cores 721 may comprise soft microprocessor cores on a single field programmable gate array (FPGA), such as semiconductor intellectual property cores (IP Core). The plurality of CPU cores 721 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 721, for example, but not limited to Instruction-level parallelism (ILP) such as, but not limited to, super-scalar pipelining, and Thread-level parallelism (TLP).

Consistent with the embodiments of the present disclosure, the aforementioned computing device 700 may employ a communication system that transfers data between components inside the aforementioned computing device 700, and/or the plurality of computing devices 700. The aforementioned communication system will be known to a person having ordinary skill in the art as a bus 730. The bus 730 may embody internal and/or external plurality of hardware and software components, for example, but not limited to a wire, optical fiber, communication protocols, and any physical arrangement that provides the same logical function as a parallel electrical bus. The bus 730 may comprise at least one of, but not limited to a parallel bus, wherein the parallel bus carry data words in parallel on multiple wires, and a serial bus, wherein the serial bus carry data in bit-serial form. The bus 730 may embody a plurality of topologies, for example, but not limited to, a multidrop/electrical parallel topology, a daisy chain topology, and a connected by switched hubs, such as USB bus. The bus 730 may comprise a plurality of embodiments, for example, but not limited to:

Internal data bus (data bus) 731/Memory bus
Control bus 732
Address bus 733
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)

HyperTransport

InfiniBand

RapidIO

Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/ Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 700 may employ hardware integrated circuits that store information for immediate use in the computing device 700, know to the person having ordinary skill in the art as primary storage or memory 740. The memory 740 operates at high speed, distinguishing it from the non-volatile storage sub-module 761, which may be referred to as secondary or tertiary storage, which provides slow-to-access information but offers higher capacities at lower cost. The contents contained in memory 740, may be transferred to secondary storage via techniques such as, but not limited to, virtual memory and swap. The memory 740 may be associated with addressable semiconductor memory, such as integrated circuits consisting of silicon-based transistors, used for example as primary storage but also other purposes in the computing device 700. The memory 740 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 741, Static Random-Access Memory (SRAM) 742, CPU Cache memory 725, Advanced Random-Access Memory (A-RAM), and other types of primary storage such as Random-Access Memory (RAM).

Non-volatile memory which can retain stored information even after power is removed, for example, but not limited to, Read-Only Memory (ROM) 743, Programmable ROM (PROM) 744, Erasable PROM (EPROM) 745, Electrically Erasable PROM (EEPROM) 746 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 700 may employ the communication system between an information processing system, such as the computing device 700, and the outside world, for example, but not limited to, human, environment, and another computing device 700. The aforementioned communication system will be known to a person having ordinary skill in the art as I/O 760. The I/O module 760 regulates a plurality of inputs and outputs with regard to the computing device 700, wherein the inputs are a plurality of signals and data received by the computing device 700, and the outputs are the plurality of signals and data sent from the computing device 700. The I/O module 760 interfaces a plurality of hardware, such as, but not limited to, non-volatile storage 761, communication devices 762, sensors 763, and peripherals 764. The plurality of hardware is used by the at least one of, but not limited to, human, environment, and another computing device 700 to communicate with the present computing device 700. The I/O module 760 may comprise a plurality of forms, for example, but not limited to channel I/O, port mapped I/O, asynchronous I/O, and Direct Memory Access (DMA).

Consistent with the embodiments of the present disclosure, the aforementioned computing device 700 may employ the non-volatile storage sub-module 761, which may be referred to by a person having ordinary skill in the art as one of secondary storage, external memory, tertiary storage, off-line storage, and auxiliary storage. The non-volatile storage sub-module 761 may not be accessed directly by the CPU 720 without using intermediate area in the memory 740. The non-volatile storage sub-module 761 does not lose data when power is removed and may be two orders of magnitude less costly than storage used in memory module, at the expense of speed and latency. The non-volatile storage sub-module 761 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (761) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, Compact-Flash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 700 may employ the communication sub-module 762 as a subset of the I/O 760, which may be referred to by a person having ordinary skill in the art as at least one of, but not limited to, computer network, data network, and network. The network allows computing devices 700 to exchange data using connections, which may be known to a person having ordinary skill in the art as data links, between network nodes. The nodes comprise network computer devices 700 that originate, route, and terminate data. The nodes are identified by network addresses and can include a plurality of hosts consistent with the embodiments of a computing device 700. The aforementioned embodiments include, but not limited to personal computers, phones, servers, drones, and networking devices such as, but not limited to, hubs, switches, routers, modems, and firewalls.

Two nodes can be said to be networked together, when one computing device 700 is able to exchange information with the other computing device 700, whether or not they have a direct connection with each other. The communication sub-module 762 supports a plurality of applications and services, such as, but not limited to World Wide Web (WWW), digital video and audio, shared use of application and storage computing devices 700, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 762 may comprise a plurality of size, topology, traffic control mechanism and organizational intent. The communication sub-module 762 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 700 may employ the sensors sub-module 763 as a subset of the I/O 760. The sensors sub-module 763 comprises at least one of the devices, modules, and subsystems whose purpose is to detect events or changes in its environment and send the information to the computing device 700. Sensors are sensitive to the measured property, are not sensitive to any property not measured, but may be encountered in its application, and do not significantly influence the measured property. The sensors sub-module 763 may comprise a plurality of digital devices and analog devices, wherein if an analog device is used, an Analog to Digital (A-to-D) converter must be employed to interface the said device with the computing device 700. The sensors may be subject to a plurality of deviations that limit sensor accuracy. The sensors sub-module 763 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 700 may employ the peripherals sub-module 762 as a subset of the I/O 760. The peripheral sub-module 764 comprises ancillary devices uses to put information into and get information out of the computing device 700. There are 3 categories of devices comprising the peripheral sub-module 764, which exist based on their relationship with the computing device 700, input devices, output devices, and input/output devices. Input devices send at least one of data and instructions to the computing device 700. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 700. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 764:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 700. The information can be stored in a multitude of formats depending on the user's requirement. Examples of types of video input devices include, but not limited to, digital camera, digital camcorder, portable media player, web cam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 700 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the computing device 700. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 762 sub-module), data storage device (non-volatile storage 761), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

IV. Aspects

The following discloses various Aspects of the present disclosure. The various Aspects are not to be construed as patent claims unless the language of the Aspect appears as a patent claim. The Aspects describe various non-limiting embodiments of the present disclosure.

Aspect 1. A non-transitory computer-readable medium comprising instructions which, when executed by one or more hardware processors, cause execution of operations comprising:

receiving raw content data;

encoding the received raw content data a plurality of times, resulting in generation of a plurality of encoded content files, wherein each of the plurality of encoded content files is encoded based on one or more quality parameters such that each of the plurality of encoded content files has a different quality;

packaging the plurality of encoded content files for distribution; and distributing one or more of the plurality of encoded content files to one or more downstream devices.

Aspect 2. The non-transitory computer-readable medium of any previous aspect, wherein the one or more downstream devices are configured to perform real-time cognitive processing of the content.

Aspect 3. The non-transitory computer-readable medium of any previous aspect, wherein the one or more downstream devices are configured to effect playback of the content.

Aspect 4. The non-transitory computer-readable medium of any previous aspect, wherein the encoding converts the received raw content data directly to a file format for use by the one or more downstream devices.

Aspect 5. The non-transitory computer-readable medium of any previous aspect, wherein the raw content is encoded in the file format for use by the one or more downstream device without any transcoding.

Aspect 6. The non-transitory computer-readable medium of any previous aspect, wherein the raw content data is received directly from a content capture device.

Aspect 7. The non-transitory computer-readable medium of any previous aspect, wherein the content data comprises one or more of video content or audio content.

Aspect 8. A system comprising:

at least one device including a hardware processor;

the system being configured to perform operations comprising:

receiving raw content data;

encoding the received raw content data a plurality of times, resulting in generation of a plurality of encoded content files, wherein each of the plurality of encoded content files is encoded based on one or more quality parameters such that each of the plurality of encoded content files has a different quality;

packaging the plurality of encoded content files for distribution; and distributing one or more of the plurality of encoded content files to one or more downstream devices.

Aspect 9. The system of any previous aspect, wherein the one or more downstream devices are configured to perform real-time cognitive processing of the content.

Aspect 10. The system of any previous aspect, wherein the one or more downstream devices are configured to effect playback of the content.

Aspect 11. The system of any previous aspect, wherein the encoding converts the received raw content data directly to a file format for use by the one or more downstream devices.

Aspect 12. The system of any previous aspect, wherein the raw content is encoded in the file format for use by the one or more downstream device without any transcoding.

Aspect 13. The system of any previous aspect, wherein the raw content data is received directly from a content capture device.

Aspect 14. The system of any previous aspect, wherein the content data comprises one or more of video content or audio content.

Aspect 15. A method comprising:

receiving raw content data;

encoding the received raw content data a plurality of times, resulting in generation of a plurality of encoded content files, wherein each of the plurality of encoded content files is encoded based on one or more quality parameters such that each of the plurality of encoded content files has a different quality;

packaging the plurality of encoded content files for distribution; and distributing one or more of the plurality of encoded content files to one or more downstream devices.

Aspect 16. The method of any previous aspect, wherein the one or more downstream devices are configured to perform real-time cognitive processing of the content.

Aspect 17. The method of any previous aspect, wherein the one or more downstream devices are configured to effect playback of the content.

Aspect 18. The method of any previous aspect, wherein the encoding converts the received raw content data directly to a file format for use by the one or more downstream devices.

Aspect 19. The method of any previous aspect, wherein the raw content is encoded in the file format for use by the one or more downstream device without any transcoding.

Aspect 20. The method of any previous aspect, wherein the raw content data is received directly from a content capture device.

Aspect 21. A non-transitory computer-readable medium comprising instructions which, when executed by one or more hardware processors, cause execution of operations comprising:

transmitting, from a first presentation device to a server, a first request for a server time;

receiving, at the first presentation device and responsive to the first request, a first server time indication;

calculating, based on a time at the first presentation device at which the first server time indication is received and the received first server time indication, a first device specific time delta associated with communication from the server;

receiving, at the first presentation device, content for presentation at the first presentation device, the content comprising a presentation timestamp indicating a time at which the content is to be presented;

calculating a first device specific presentation time based on the first device specific time delta and the presentation timestamp; and responsive to a current time at the first presentation device matching the first device specific presentation time, presenting the received content.

Aspect 22. The non-transitory computer readable medium of any previous aspect, the operations further comprising:

transmitting, from a second presentation device to the server, a second request for a server time;

receiving, at the second presentation device and responsive to the second request, a second server time indication;

calculating, based on a time at the second presentation device at which the second server time indication is received and the received second server time indication, a second device specific time delta associated with communication from the server;

receiving, at the second presentation device, the content for presentation at the second presentation device, the content comprising the presentation timestamp indicating the time at which the content is to be presented;

calculating a second device specific presentation time based on the second device specific time delta and the presentation timestamp; and responsive to a current time at the second presentation device matching the second device specific presentation time, presenting the received content.

Aspect 23. The non-transitory computer readable medium of any previous aspect, wherein the first device specific presentation time and the second device specific presentation each correspond to the presentation time indicated by the server, such that the content is presented at both the first presentation device and the second presentation device substantially simultaneously.

Aspect 24. The non-transitory computer readable medium of any previous aspect, wherein the server transmits the content to the first presentation device and the second presentation device substantially contemporaneously.

Aspect 25. The non-transitory computer readable medium of any previous aspect, wherein calculating the first device specific time delta comprises subtracting the time at the first presentation device at which the first server time indication is received from a time indicated by the first server time indication.

Aspect 26. The non-transitory computer readable medium of any previous aspect, further comprising:

determining a network round-trip time between the first presentation device and the server based on a difference between the time at which the first request was transmitted and the time at which the first server time indication was received;

wherein calculating the first device specific time delta is adjusted based on the network round trip time.

Aspect 27. The non-transitory computer readable medium of any previous aspect, wherein the server time is determined based on a network time protocol (NTP) server.

Aspect 28. A method comprising:

transmitting, from a first presentation device to a server, a first request for a server time;

receiving, at the first presentation device and responsive to the first request, a first server time indication;

calculating, based on a time at the first presentation device at which the first server time indication is received and the received first server time indication, a first device specific time delta associated with communication from the server;

receiving, at the first presentation device, content for presentation at the first presentation device, the content comprising a presentation timestamp indicating a time at which the content is to be presented;

calculating a first device specific presentation time based on the first device specific time delta and the presentation timestamp; and responsive to a current time at the first presentation device matching the first device specific presentation time, presenting the received content.

Aspect 29. The method of any previous aspect, further comprising:

transmitting, from a second presentation device to the server, a second request for a server time;

receiving, at the second presentation device and responsive to the second request, a second server time indication;

calculating, based on a time at the second presentation device at which the second server time indication is received and the received second server time indication, a second device specific time delta associated with communication from the server;

receiving, at the second presentation device, the content for presentation at the second presentation device, the content comprising the presentation timestamp indicating the time at which the content is to be presented;

calculating a second device specific presentation time based on the second device specific time delta and the presentation timestamp; and responsive to a current time at the second presentation device matching the second device specific presentation time, presenting the received content.

Aspect 30. The method of any previous aspect, wherein the first device specific presentation time and the second device specific presentation each correspond to the presentation time indicated by the server, such that the content is presented at both the first presentation device and the second presentation device substantially simultaneously.

Aspect 31. The method of any previous aspect, wherein the server transmits the content to the first presentation device and the second presentation device substantially contemporaneously.

Aspect 32. The method of any previous aspect, wherein calculating the first device specific time delta comprises subtracting the time at the first presentation device at which the first server time indication is received from a time indicated by the first server time indication.

Aspect 33. The method of any previous aspect, further comprising:

determining a network round-trip time between the first presentation device and the server based on a difference between the time at which the first request was transmitted and the time at which the first server time indication was received;

wherein calculating the first device specific time delta is adjusted based on the network round trip time.

Aspect 34. The method of any previous aspect, wherein the server time is determined based on a network time protocol (NTP) server.

Aspect 35. A system comprising:

at least one device including a hardware processor;

the system being configured to perform operations comprising:

transmitting, from a first presentation device to a server, a first request for a server time;

receiving, at the first presentation device and responsive to the first request, a first server time indication;

calculating, based on a time at the first presentation device at which the first server time indication is received and the received first server time indication, a first device specific time delta associated with communication from the server;

receiving, at the first presentation device, content for presentation at the first presentation device, the content comprising a presentation timestamp indicating a time at which the content is to be presented;

calculating a first device specific presentation time based on the first device specific time delta and the presentation timestamp; and responsive to a current time at the first presentation device matching the first device specific presentation time, presenting the received content.

Aspect 36. The system of any previous aspect, the operations further comprising:

transmitting, from a second presentation device to the server, a second request for a server time;

receiving, at the second presentation device and responsive to the second request, a second server time indication;

calculating, based on a time at the second presentation device at which the second server time indication is received and the received second server time indication, a second device specific time delta associated with communication from the server;

receiving, at the second presentation device, the content for presentation at the second presentation device, the content comprising the presentation timestamp indicating the time at which the content is to be presented;

calculating a second device specific presentation time based on the second device specific time delta and the presentation timestamp; and responsive to a current time at the second presentation device matching the second device specific presentation time, presenting the received content.

Aspect 37. The system of any previous aspect, wherein the first device specific presentation time and the second device specific presentation each correspond to the presentation time indicated by the server, such that the content is presented at both the first presentation device and the second presentation device substantially simultaneously.

Aspect 38. The system of any previous aspect, wherein the server transmits the content to the first presentation device and the second presentation device substantially contemporaneously.

Aspect 39. The system of any previous aspect, wherein calculating the first device specific time delta comprises subtracting the time at the first presentation device at which the first server time indication is received from a time indicated by the first server time indication.

Aspect 40. The system of any previous aspect, further comprising:
determining a network round-trip time between the first presentation device and the server based on a difference between the time at which the first request was transmitted and the time at which the first server time indication was received;
wherein calculating the first device specific time delta is adjusted based on the network round trip time.

Aspect 41. A non-transitory computer-readable medium comprising instructions which, when executed by one or more hardware processors, cause execution of operations comprising:
receiving, from a content source, content for packaging into a content file, the content comprising one or more of video data and audio data;
receiving, from a data source, secondary data for synchronous visualization with the received content;
packaging the received content and the received secondary data into a single data container, the data container complying with MP4 standards, and
transmitting the packaged single container including the content and the secondary data to one or more viewing devices for synchronous display based at least in part on the timestamp.

Aspect 42. The non-transitory computer-readable medium of any previous aspect, wherein the secondary data comprises a plurality of sensor readings, and wherein each sensor reading is associated with:
sensor timestamp data indicative of a time that the sensor reading was received at a server associated with the data source, and
latency data indicating a difference between a time at which the sensor reading was measured by the sensor and the time that the sensor reading was received at the server.

Aspect 43. The non-transitory computer-readable medium of any previous aspect, wherein the data container comprises:
a header box storing header information,
one or more metadata boxes storing metadata associated with the content,
a primary data box for storing the content, and
a synchronized data box for storing the received secondary data, together with the sensor timestamp data and the latency data;

Aspect 44. The non-transitory computer-readable medium of any previous aspect, wherein the one or more viewing devices comprises a single viewing device configured to synchronously display the content and the secondary data.

Aspect 45. The non-transitory computer-readable medium of any previous aspect, wherein the one or more viewing devices comprises a plurality of viewing devices, a first subset of the plurality of viewing devices being configured to display the content, and a second subset of the plurality of viewing devices being configured to display the secondary data synchronously with the content.

Aspect 46. The non-transitory computer-readable medium of any previous aspect, wherein the secondary data comprises data about one or more of:
a location of the content source;
an orientation of the content source; or
a measured property of a subject of the content.

Aspect 47. The non-transitory computer-readable medium of any previous aspect, wherein the content comprises content timestamp data indicating a time offset from a beginning of the content, and wherein the content timestamp data, the sensor timestamp data, and the latency data are used to synchronize a visualization of the secondary data with a playback of the content.

Aspect 48. A method comprising:
receiving, from a content source, content for packaging into a content file, the content comprising one or more of video data and audio data;
receiving, from a data source, secondary data for synchronous visualization with the received content;
packaging the received content and the received secondary data into a single data container, the data container complying with MP4 standards, and
transmitting the packaged single container including the content and the secondary data to one or more viewing devices for synchronous display based at least in part on the timestamp.

Aspect 49. The method of any previous aspect, wherein the secondary data comprises a plurality of sensor readings, and wherein each sensor reading is associated with:
sensor timestamp data indicative of a time that the sensor reading was received at a server associated with the data source, and
latency data indicating a difference between a time at which the sensor reading was measured by the sensor and the time that the sensor reading was received at the server.

Aspect 50. The method of any previous aspect, wherein the data container comprises:
a header box storing header information,
one or more metadata boxes storing metadata associated with the content,
a content box for storing the content, and
a synchronized data box for storing the received secondary data, together with the sensor timestamp data and the latency data.

Aspect 51. The method of any previous aspect, wherein the one or more viewing devices comprises a single viewing device configured to synchronously display the content and the secondary data.

Aspect 52. The method of any previous aspect, wherein the one or more viewing devices comprises a plurality of viewing devices, a first subset of the plurality of viewing devices being configured to display the content, and a second subset of the plurality of viewing devices being configured to display the secondary data synchronously with the content.

Aspect 53. The method of any previous aspect, wherein the secondary data comprises data about one or more of:
a location of the content source;
an orientation of the content source; or
a measured property of a subject of the content.

Aspect 54. The method of any previous aspect, wherein the content comprises content timestamp data indicating a time offset from a beginning of the content, and wherein the content timestamp data, the sensor timestamp data, and the latency data are used to synchronize a visualization of the secondary data with a playback of the content.

Aspect 55. A system comprising:

at least one device including a hardware processor;

the system being configured to perform operations comprising:

receiving, from a content source, content for packaging into a content file, the content comprising one or more of video data and audio data;

receiving, from a data source, secondary data for synchronous visualization with the received content;

packaging the received content and the received secondary data into a single data container, the data container complying with MP4 standards, and transmitting the packaged single container including the content and the secondary data to one or more viewing devices for synchronous display based at least in part on the timestamp.

Aspect 56. The system of any previous aspect, wherein the secondary data comprises a plurality of sensor readings, and wherein each sensor reading is associated with:

sensor timestamp data indicative of a time that the sensor reading was received at a server associated with the data source, and latency data indicating a difference between a time at which the sensor reading was measured by the sensor and the time that the sensor reading was received at the server.

Aspect 57. The system of any previous aspect, wherein the data container comprises:

a header box storing header information, one or more metadata boxes storing metadata associated with the content, a primary data box for storing the content, and a synchronized data box for storing the received secondary data, together with the sensor timestamp data and the latency data.

Aspect 58. The system of any previous aspect, wherein the one or more viewing devices comprises a single viewing device configured to synchronously display the content and the secondary data.

Aspect 59. The system of any previous aspect, wherein the one or more viewing devices comprises a plurality of viewing devices, a first subset of the plurality of viewing devices being configured to display the content, and a second subset of the plurality of viewing devices being configured to display the secondary data synchronously with the content.

Aspect 60. The system of any previous aspect, wherein the content comprises content timestamp data indicating a time offset from a beginning of the content, and wherein the content timestamp data, the sensor timestamp data, and the latency data are used to synchronize a visualization of the secondary data with a playback of the content.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A non-transitory computer-readable medium comprising instructions which, when executed by one or more hardware processors, cause execution of operations comprising:

receiving, from a content source, content for packaging into a content file, the content comprising one or more of video data and audio data;

receiving, from a data source, secondary data for synchronous visualization with the received content, wherein the secondary data comprises a plurality of sensor readings;

packaging the received content and the received secondary data into a single data container, and transmitting the packaged single container including the content and the secondary data to one or more viewing devices for synchronous display of both the content and the secondary data.

2. The non-transitory computer-readable medium of claim 1, wherein each sensor reading is associated with:

sensor timestamp data indicative of a time that the sensor reading was received at a server associated with the data source, and latency data indicating a difference between a time at which the sensor reading was measured by the sensor and the time that the sensor reading was received at the server.

3. The non-transitory computer-readable medium of claim 2, wherein the data container comprises:

a header box storing header information, one or more metadata boxes storing metadata associated with the content, a primary data box for storing the content, and a synchronized data box for storing the received secondary data, together with the sensor timestamp data and the latency data.

4. The non-transitory computer-readable medium of claim 2, wherein the one or more viewing devices comprises a single viewing device configured to synchronously display the content and the secondary data.

5. The non-transitory computer-readable medium of claim 2, wherein the one or more viewing devices comprises a plurality of viewing devices, a first subset of the plurality of viewing devices being configured to display the content, and a second subset of the plurality of viewing devices being configured to display the secondary data synchronously with the content.

6. The non-transitory computer-readable medium of claim 2, wherein the secondary data comprises data about one or more of:

a location of the content source;

an orientation of the content source; or a measured property of a subject of the content.

7. The non-transitory computer-readable medium of claim 2, wherein the content comprises content timestamp data indicating a time offset from a beginning of the content, and wherein the content timestamp data, the sensor timestamp data, and the latency data are used to synchronize a visualization of the secondary data with a playback of the content.

8. A method comprising:

receiving, from a content source, content for packaging into a content file, the content comprising one or more of video data and audio data;

receiving, from a data source, secondary data for synchronous visualization with the received content, wherein the secondary data comprises a plurality of sensor readings;

packaging the received content and the received secondary data into a single data container, and transmitting the packaged single container including the content and the secondary data to one or more viewing devices for synchronous display of both the content and the secondary data.

9. The method of claim 8, wherein each sensor reading is associated with:

sensor timestamp data indicative of a time that the sensor reading was received at a server associated with the data source, and latency data indicating a difference between a time at which the sensor reading was measured by the sensor and the time that the sensor reading was received at the server.

10. The method of claim 9, wherein the data container comprises:

a header box storing header information, one or more metadata boxes storing metadata associated with the content, a primary data box for storing the content, and a synchronized data box for storing the received secondary data, together with the sensor timestamp data and the latency data.

11. The method of claim 9, wherein the one or more viewing devices comprises a single viewing device configured to synchronously display the content and the secondary data.

12. The method of claim 9, wherein the one or more viewing devices comprises a plurality of viewing devices, a first subset of the plurality of viewing devices being configured to display the content, and a second subset of the plurality of viewing devices being configured to display the secondary data synchronously with the content.

13. The method of claim 9, wherein the secondary data comprises data about one or more of:

a location of the content source;

an orientation of the content source; or a measured property of a subject of the content.

14. The method of claim 9, wherein the content comprises content timestamp data indicating a time offset from a beginning of the content, and wherein the content timestamp data, the sensor timestamp data, and the latency data are used to synchronize a visualization of the secondary data with a playback of the content.

15. A system comprising:

at least one device including a hardware processor;

the system being configured to perform operations comprising:

receiving, from a content source, content for packaging into a content file, the content comprising one or more of video data and audio data;

receiving, from a data source, secondary data for synchronous visualization with the received content, wherein the secondary data comprises a plurality of sensor readings;

packaging the received content and the received secondary data into a single data container, and transmitting the packaged single container including the content and the secondary data to one or more viewing devices for synchronous display of both the content and the secondary data.

16. The system of claim 15, wherein each sensor reading is associated with:

sensor timestamp data indicative of a time that the sensor reading was received at a server associated with the data source, and latency data indicating a difference between a time at which the sensor reading was measured by the sensor and the time that the sensor reading was received at the server.

17. The system of claim 16, wherein the data container comprises:

a header box storing header information, one or more metadata boxes storing metadata associated with the content, a primary data box for storing the content, and a synchronized data box for storing the received secondary data, together with the sensor timestamp data and the latency data.

18. The system of claim 16, wherein the one or more viewing devices comprises a single viewing device configured to synchronously display the content and the secondary data.

19. The system of claim 16, wherein the one or more viewing devices comprises a plurality of viewing devices, a first subset of the plurality of viewing devices being configured to display the content, and a second subset of the plurality of viewing devices being configured to display the secondary data synchronously with the content.

20. The system of claim 16, wherein the content comprises content timestamp data indicating a time offset from a beginning of the content, and wherein the content timestamp data, the sensor timestamp data, and the latency data are used to synchronize a visualization of the secondary data with a playback of the content.

* * * * *